C. C. JONES.
SPRING MOUNTING FOR VEHICLES.
APPLICATION FILED MAY 15, 1914.
1,172,529.
Patented Feb. 22, 1916.
2 SHEETS—SHEET 2.
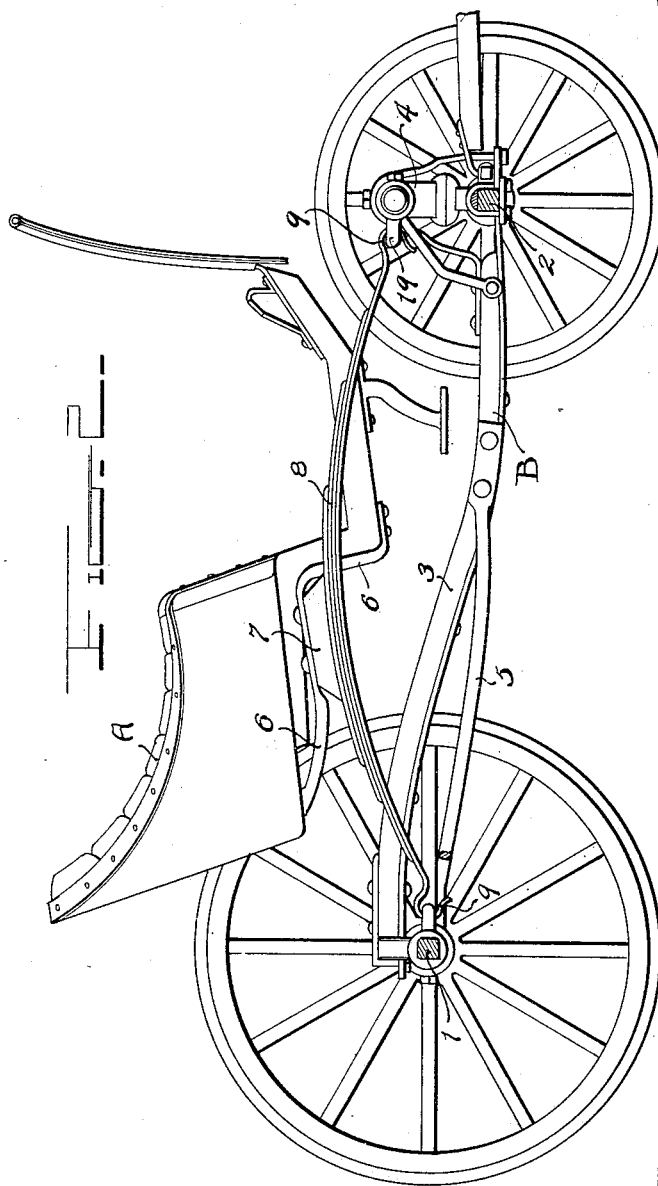
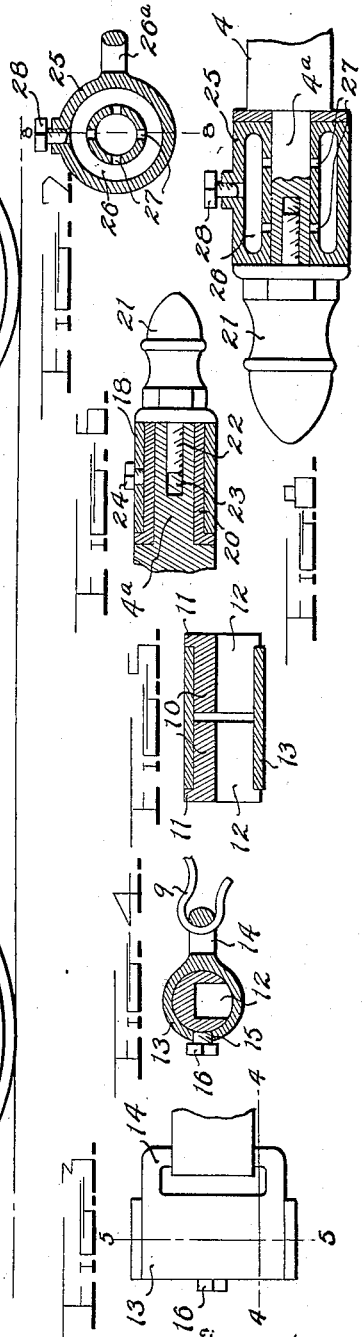
Witnesses
Harry B. Rook.
H. B. Cornwall.
Inventor
Charles C. Jones
By
N. S. Hice
Attorney

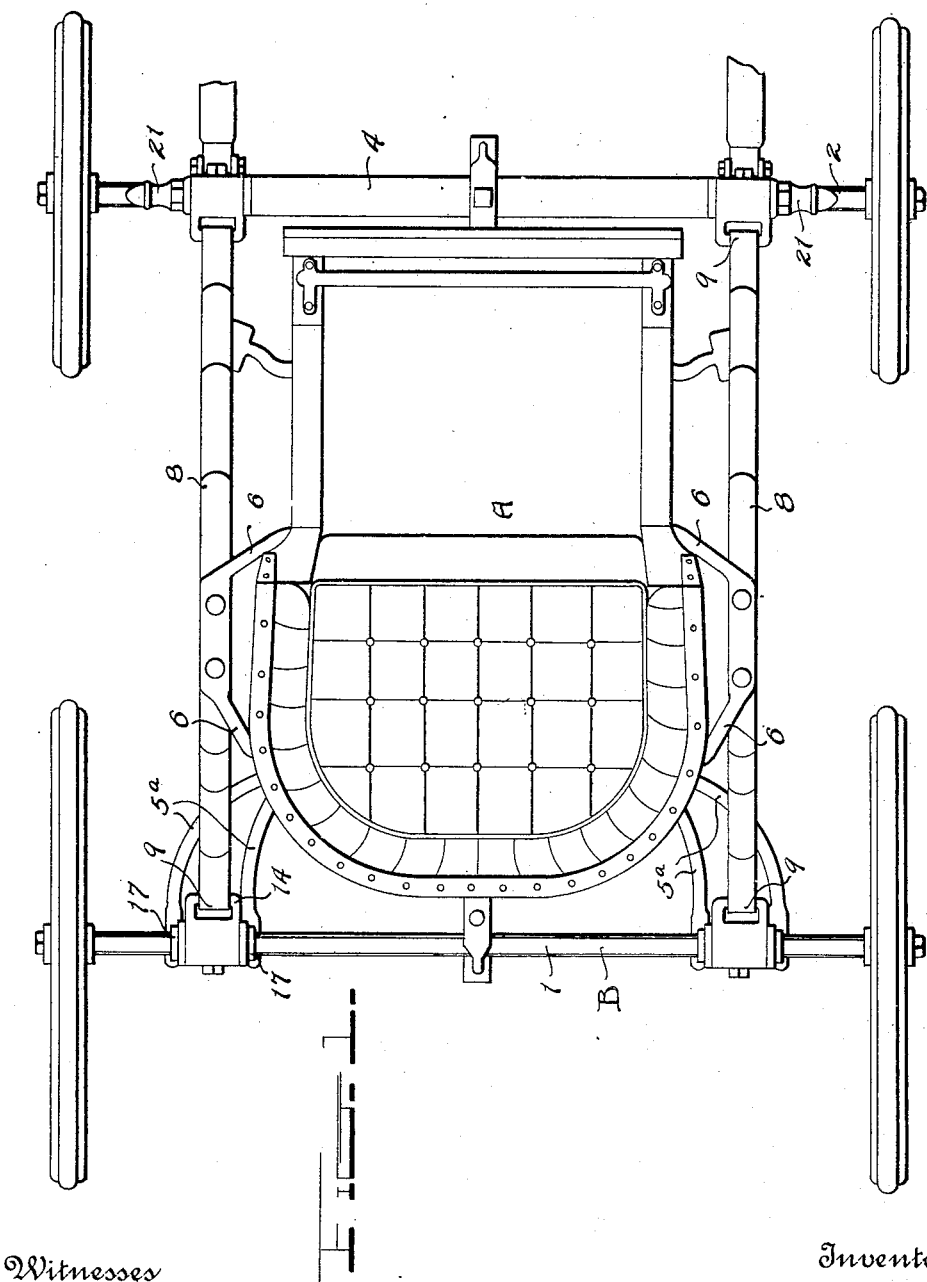

UNITED STATES PATENT OFFICE.

CHARLES C. JONES, OF DULUTH, MINNESOTA.

SPRING-MOUNTING FOR VEHICLES.

1,172,529.  Specification of Letters Patent.  Patented Feb. 22, 1916.

Application filed May 15, 1914. Serial No. 838,734.

*To all whom it may concern:*

Be it known that I, CHARLES C. JONES, citizen of the United States, residing at Duluth, in the county of St. Louis and State of Minnesota, have invented certain new and useful Improvements in Spring-Mountings for Vehicles, of which the following is a specification.

The present invention relates to an improved spring mounting for supporting the body of a vehicle upon the running gear, the object of the invention being to provide a device of this character which embodies novel features of construction whereby all shocks and jars are absorbed in the most effective manner, thereby reducing the wear and tear upon the vehicle and tending to prolong the life thereof, as well as being conducive to the comfort of the occupants.

A further object of the invention is to provide a spring mounting for the bodies of vehicles which is comparatively simple and inexpensive in its construction, which will not work loose so as to produce an objectionable rattling noise, which provides for an effective lubrication of the parts, which admits of worn parts being readily replaced, and which can be advantageously employed in connection with all kinds of vehicles such as carriages, wagons, automobiles, air ships, cars, railway rolling stock, and the like.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a vehicle provided with a spring mounting constructed in accordance with the invention. Fig. 2 is a side elevation of the same with one pair of wheels removed and the axles appearing in section. Fig. 3 is an enlarged plan view of the connection between the rear ends of the leaf springs and the rear axle. Fig. 4 is a transverse sectional view on the line 4—4 of Fig. 3. Fig. 5 is a longitudinal sectional view on the line 5—5 of Fig. 3. Fig. 6 is an enlarged detail view of one end of the vehicle bolster, showing the bearing sleeve thereon, portions being broken away and shown in section. Fig. 7 is a transverse sectional view through a modified form of bearing sleeve which is provided with an annular oil well. Fig. 8 is a longitudinal sectional view on the line 8—8 of Fig. 7, portions of the bolster being shown.

Corresponding and like parts are referred to in the following description and indicated in all the views of the drawings by the same reference characters.

For the purpose of illustration the invention has been shown as applied to a carriage including a body A and running gear B, although it will be understood that the improved spring mounting may also be advantageously employed in connection with automobiles, air-ships, motorcycles, railway rolling stock, and the like. As shown upon the drawing the running gear B includes a rear axle 1 and front axle 2, together with a reach 3, the front axle 2 being arranged under and pivotally connected to the bolster 4 in the usual manner, while the rear end of the reach is connected to opposite ends of the rear axle 1 by the hounds 5. Opposite sides of the vehicle body A are provided with suitable brackets 6 carrying blocks 7 which rest upon and are secured to the central portions of upwardly arched and longitudinally disposed leaf or half elliptic springs 8. These springs 8 provide the sole support for the vehicle body, one of them being arranged upon each side thereof. The two extremities of the springs 8 terminate in hook members 9 by means of which they are loosely connected to bearing sleeves upon the rear axle and bolster respectively.

Referring to Figs. 3, 4 and 5, the numerals 10 designate a pair of substantially cylindrical bearing blocks which are provided at the ends thereof with flanges 11, and have longitudinally disposed square or polygonal recesses 12 in one side thereof. These recessed portions 12 are of a size and shape corresponding to the square or polygonal formation of the rear axle 1 and are adapted to be applied thereto so as to provide a bearing for the sleeve 13. A shackle 14 projects laterally from one side of the bearing sleeve 13 and loosely receives the hooked end 9 of the spring 8. The bearing sleeve 13 is also provided with an oil opening 15 which may be normally closed by a suitable cap 16. The cylindrical bearing blocks 10 each have a length which is approximately half the length of the bearing sleeve 13 so that when inserted in opposite ends of the bearing sleeve the flanges 11 will engage the ends of the bearing sleeve and retain the bearing sleeve in a properly centered position. In applying the bearing members to the rear axle, the inner bearing block 10 would first be fitted upon the square axle from the top thereof, the sleeve 13 slipped over the end of the axle and applied to the first bearing block, and the second or outer bearing block then applied to the axle and slipped within the bearing sleeve. It is contemplated to provide suitable stop collars on the axle to hold the bearing blocks 10 against longitudinal movement thereon. In the present instance the rear ends of the hounds 5 are each bifurcated to provide the two arms 5ª which are connected to the rear axle by suitable clamping members such as the U bolts 17, said U bolts serving to engage the bearing blocks 10 to retain the same in proper position. Means is thus provided for readily applying the proper bearing to the conventional form of square axle.

The extremities of the bolster 4 are reduced to provide pintles 4ª which receive a second set of bearing sleeves 18, said bearing sleeves being formed with laterally projecting shackles 19 which loosely receive the hook members 9 at the forward ends of the springs 8. Tubular bushings 20 surround the pintles 4ª and are interposed between the same and the bearing sleeves 18 so as to reduce the friction and wear as much as possible. Caps 21 are detachably applied to the extremities of the bolster to hold the bearing sleeves 18 against displacement, said caps being formed with threaded stems 22 which are fitted within axial openings 23 in the extremities of the pintles 4ª. The bearing sleeves 20 are free to rotate as the springs 8 are flexed, thereby reducing the friction and enabling the shocks and jars to be absorbed in the most effective manner. Each of the bearing sleeves 18 is shown as provided with an oil opening which is normally closed by a suitable plug 24.

Figs. 7 and 8 illustrate a modified construction of the bearing sleeve in which an oil well is provided from which oil is automatically fed to the bearing as required. The bearing sleeve 25 is adapted to be fitted upon the pintle 4ª of the bolster 4 and retained in position thereon by means of the cap 21, exactly as in the previous instance. A shackle 26ª also projects laterally from one side of the bearing sleeve for engagement with the hooked end 9 of the spring 8. It will be observed, however, that the bearing sleeve is formed with an annular oil chamber extending completely around the central opening thereof, and that a series of feed openings 27 lead from this oil chamber or reservoir to the central opening so that oil can be supplied to the pintle 4ª as required. The top of the bearing sleeve 25 is formed with an oil inlet opening normally closed by a plug 28. The chamber or reservoir 26 is designed to be kept partially or completely filled with oil which will be supplied to the pintle 4ª through the feed openings 27 as required, thereby rendering frequent applications of lubricant unnecessary.

It is designed to use two of the springs to support a vehicle body and these springs may either be disposed at opposite sides of the vehicle body or at opposite ends thereof, as may be desired. In the operation of the device the ready flexing of the springs 8 will serve to absorb all shocks and jars so as to enable the vehicle to pass over comparatively large obstructions and to travel upon rough roads without causing serious discomfort to the occupants or producing unnecessary wear and tear upon the vehicle itself. Where pneumatic tires are employed, as in connection with automobiles, it has been found that the wear upon the tires is very materially reduced where this spring mounting is employed. As the two springs flex to accommodate the up and down vibration of the vehicle body, the bearing sleeves upon the rear axle and bolster rotate back and forth so as to eliminate all unnecessary friction and binding and permit a free and easy operation of the device.

Having thus described the invention, what I claim as new and desire to secure by Letters Patent, is:—

1. A spring mounting for vehicles, including a bearing block having a polygonal opening in one side thereof adapted to fit over a vehicle axle and interlock therewith, a bearing sleeve rotatably mounted upon the bearing block, and a vehicle spring operatively connected to the bearing sleeve.

2. A spring mounting for vehicles including a bearing block having a polygonal opening in one side thereof adapted to fit over a vehicle axle and interlock therewith, a bearing sleeve rotatable upon the bearing, a second bearing sleeve, a bearing for the second bearing sleeve, and a leaf spring having the ends thereof flexibly connected to the two bearing sleeves.

3. A spring mounting for vehicles including a bearing block having a polygonal opening in one side thereof adapted to fit over a vehicle axle and interlock therewith, a bearing sleeve rotatable on the bearing and formed with a shackle, means for holding the bearing sleeve in position upon the bearing, and a vehicle spring flexibly connected to the shackle.

4. A spring mounting for vehicles including a pair of approximately cylindrical bearing blocks having flanged ends and formed with polygonal side openings adapted to fit over and interlock with a vehicle axle, a bearing sleeve rotatable upon the bearing blocks between the flanged ends thereof, and a vehicle spring having a flexible connection with the bearing sleeve.

5. A spring mounting for vehicles including a pair of bearing blocks having flanged ends and formed with polygonal side openings adapted to fit over and interlock with the rear axle of a running gear, a bearing sleeve rotatable upon the bearing blocks between the flanged ends thereof, means upon the rear axle for holding the bearing blocks in position thereon, a second bearing sleeve mounted upon the bolster of the running gear, and a half elliptic spring having opposite ends thereof flexibly connected to the respective bearing sleeve.

6. A spring mounting for vehicle including a bearing, an oil reservoir rotatably mounted upon the bearing and constructed to supply oil thereto, and a vehicle spring having a flexible connection with the oil reservoir.

7. A spring mounting for vehicles including a bearing, a bearing sleeve rotatable upon the bearing and formed with an annular oil chamber and a feed opening leading from the oil chamber to the bearing, and a vehicle spring having a flexible connection with the bearing sleeve.

8. A spring mounting for vehicles including a bearing, a bearing sleeve rotatable thereon and formed with an oil chamber and feed openings leading from the oil chamber to the bearing, said bearing sleeve being also formed with a shackle, and a vehicle spring having a flexible connection with the shackle.

9. A spring mounting for vehicles including a polygonal support, a pair of bearing blocks having flanged ends and formed with polygonal side openings adapted to fit over and interlock with the polygonal support, a bearing sleeve rotatable upon the bearing blocks between the flanged ends thereof, and a vehicle spring having a flexible connection with the bearing sleeve.

In testimony whereof I affix my signature in presence of two witnesses.

CHARLES C. JONES.

Witnesses:
S. J. PITTS,
S. H. NELSON.

Copies of this patent may be obtained for five cents each, by addressing the "Commissioner of Patents, Washington, D. C."